United States Patent [19]

Okamoto et al.

[11] Patent Number: 4,902,735
[45] Date of Patent: Feb. 20, 1990

[54] HIGH IMPACT RESISTANT POLYCARBONATE AND PROCESS FOR PRODUCING SAID POLYCARBONATE

[75] Inventors: Masaya Okamoto; Eiichi Terada, both of Ichihara, Japan

[73] Assignee: Idemitsu Petrochemical Co., Ltd., Tokyo, Japan

[21] Appl. No.: 186,888

[22] Filed: Apr. 27, 1988

[30] Foreign Application Priority Data

Jun. 3, 1987 [JP] Japan .............................. 62-138185
Sep. 11, 1987 [JP] Japan .............................. 62-226548

[51] Int. Cl.$^4$ .......................... C08K 5/52; C08G 63/62
[52] U.S. Cl. ................................ 524/151; 524/141; 524/145; 524/147; 525/394; 525/462; 528/196; 528/204
[58] Field of Search .............. 528/196, 204; 525/394, 525/462, 470; 524/147, 151, 153, 141, 145

[56] References Cited

U.S. PATENT DOCUMENTS 3,340,229 9/1967 Bostian et al. ..................... 528/202
3,475,373 10/1969 Jackson ............................ 525/462
4,775,739 10/1988 Hasuo et al. ..................... 528/196

FOREIGN PATENT DOCUMENTS 51-20993 2/1976 Japan .
58-101111 6/1983 Japan .

Primary Examiner—Veronica P. Hoke
Attorney, Agent, or Firm—Frishauf, Holtz, Goodman & Woodward

[57] ABSTRACT

High impact resistant polycarbonate, a process for producing said polycarbonate, and a polycarbonate resin composition are disclosed. This polycarbonate consists of a main chain with a cumylphenoxy group, as a terminal group, bonded to at least one end thereof, said main chain comprising a repeating unit represented by the formula (I):

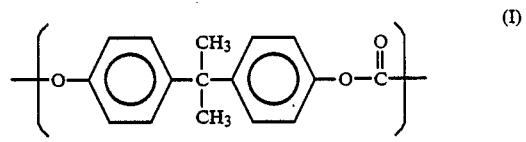

and has a viscosity average molecular weight of at least 10,000 and an acetone soluble content of not more than 3.5 wt %. The polycarbonate can be efficiently produced by the process of the invention. The composition comprises a polycarbonate resin and a specific amount of a phosphorus-based antioxidant.

11 Claims, No Drawings

HIGH IMPACT RESISTANT POLYCARBONATE AND PROCESS FOR PRODUCING SAID POLYCARBONATE

BACKGROUND OF THE INVENTION

1. Field of the Invention

The present invention relates to high impact resistant polycarbonate, a process for producing said polycarbonate, and a polycarbonate resin composition. More particularly, it relates to a novel high impact resistant polycarbonate resin having cumylphenoxy group as terminal group(s), a viscosity average molecular weight of at least 10,000 and an acetone soluble content of not more than 3.5% by weight; a process for efficiently producing said polycarbonate resin; and a polycarbonate resin composition which is of high fluidity and has high impact resistance, and is rarely subject to a reduction in molecular weight during molding thereof.

2. Description of Related Art

A process for producing polycarbonate using cumylphenol as a terminator or polymerization modifier has heretofore been known, as described in Japanese Patent Application Laid-Open No. 20993/1976. The polycarbonate produced by this process, however, suffers from a disadvantage in that impact resistance is not sufficiently high, because it is produced by the conventional process with no special modifications except that cumylphenol is used as a terminator.

As a result of extensive investigations, it has been found that the polycarbonate produced by the process described in Japanese Patent Application Laid-Open No. 20993/1976, has the acetone soluble content of 3.5% by weight or more, which is mainly responsible for a reduction in impact resistance.

Based on the above findings, further investigations have been made to develop polycarbonate which is excellent in impact resistance. As a result, it has been found that if a polycarbonate oligomer and bisphenol A as polymerization starting materials and cumylphenol as a terminator are first reacted under the turbulent flow condition and, thereafter, an aqueous solution of alkali hydroxide is added thereto and the resulting mixture is further reacted under the laminar flow condition, there can be obtained novel polycarbonate which has a decreased acetone soluble content and is of improved impact resistance.

Polycarbonate is generally excellent in heat resistance, mechanical characteristics (particularly impact resistance), optical characteristics and electrical characteristics, and further is low in shrinkage during molding because it is an amorphous polymer. Thus it has been widely used in production of electric parts, illumination devices, OA (office automation) devices, construction materials, automobile parts, and so forth, particularly as a typical engineering plastic material.

A molding of polycarbonate has to be carried out at elevated temperatures. During this molding, therefore, the carbonate bond in the polymer main chain undergoes decomposition, and the polycarbonate is inevitably colored and subject to a reduction in mechanical strength. Particularly in molding of an article which is thin in wall or is in a complicated shape, especially high temperature is needed to lower the melt viscosity and thus the polycarbonate is subject to serious thermal deterioration.

In order to overcome the above problem, an antioxidant has been added to polycarbonate. However, if antioxidants other than phosphorus-based antioxidants are used, coloration cannot be prevented, and even if phosphorus-based antioxidants are used, a sufficiently high mechanical strength, particularly a sufficiently high impact resistance at low temperatures cannot be obtained.

Moreover, in order to permit molding in a complicated shape, a lubricant has been added. Addition of a lubricant, however, causes a reduction in molecular weight during molding, thereby decreasing the mechanical strength.

It has therefore been desired to overcome the above problems. As a result of investigations, it has been found that when a specified amount of a phosphorus-based antioxidant is added to a polycarbonate resin produced using cumylphenol as a polymerization modifier, a high mechanical strength is unexpectedly obtained, and even if a lubricant is added, the mechanical strength is maintained without a reduction of molecular weight.

SUMMARY OF THE INVENTION

An object of the present invention is to provide a novel polycarbonate resin having improved impact resistance.

Another object of the present invention is to provide a process for efficiently producing a polycarbonate resin having improved impact resistance.

Still another object of the present invention is to provide a polycarbonate resin composition which is almost free from a reduction of molecular weight and a reduction of mechanical strength during the molding thereof.

Other objects and the advantages of the present invention will become apparent from the following explanation.

The present invention relates to high impact resistant polycarbonate which has a main chain comprising a repeating unit represented by the formula (I):

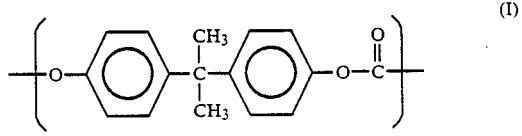

and at least one terminal thereof, a cumylphenoxy group represented by the formula (II):

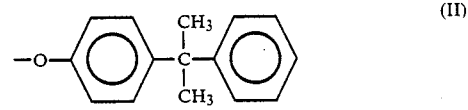

and which has a viscosity average molecular weight of at least 10,000 and an acetone soluble content of not more than 3.5% by weight. This is hereinafter referred to as the "first invention".

The present invention relates to a process for producing the above high impact resistant polycarbonate which comprises reacting a polycarbonate oligomer derived from bisphenol A, bisphenol A and cumylphenol while stirring in such a manner that the reaction mixture is in a turbulent flow and when the viscosity of the reaction mixture increases, adding an aqueous alkali hydroxide solution thereto and further reacting the resulting mixture in a laminar flow condition. This is hereinafter referred to as the "second invention".

The present invention further relates to a polycarbonate resin composition comprising a polycarbonate resin produced using a cumylphenol as a polymerization modifier and 0.01 to 0.13 part by weight per 100 parts of the polycarbonate resin of a phosphorus-based antioxidant. This is hereinafter referred to as the "third invention". In the polycarbonate resin composition, the polycarbonate resin produced using a cumylphenol as a polymerization modifier includes the high impact resistant polycarbonate of the first invention.

DESCRIPTION OF PREFERRED EMBODIMENTS

The polycarbonate of the first invention is a polymer comprising the repeating unit represented by the formula (I), with a cumylphenoxy group (p-cumylphenoxy group) bonded at at least one terminal thereof, preferably with cumylphenoxy groups bonded at both terminals thereof. If the terminal group is a p-tert-butylphenoxy group which has been well known as a terminal group for the conventional polycarbonate resins, the resulting polycarbonate resin is not satisfactory in impact resistance.

The viscosity average molecular weight of the polycarbonate of the first invention is at least 10,000, preferably 10,000 to 50,000 and particularly preferably 15,000 to 30,000. If the viscosity average molecular weight is less than 10,000, impact resistance is not sufficiently high.

The acetone soluble content of the polycarbonate of the first invention is not more than 3.5% by weight. If the acetone soluble content is more than 3.5% by weight, impact resistance is not sufficiently high. The acetone soluble content was measured as follows:

A polycarbonate sample was ground and filtered with a 100 mesh metal screen. Then, 15 g of the sample having passed through the metal screen was placed in a cylindrical filter paper No. 84 (28 mm × 100 mm) and extracted with 300 milliliters (ml) of acetone in a Soxhlet extractor by refluxing it for 8 hours in such a manner that 20 ml of the acetone was refluxed once per 3-4 minutes. Then, the acetone was evaporated, and the residue was weighed. Based on the weight of the residue, the acetone soluble content was determined, and it was indicated in percent by weight.

The polycarbonate of the first invention comprises, as described above, a main chain comprising the repeating unit represented by the formula (I) and a cumylphenoxy group or cumylphenoxy groups bonded thereto as a terminal group or terminal groups, as represented by the formula (II). The main chain may contain a small amount of a repeating unit or repeating units other than that of the formula (I).

The polycarbonate of the first invention can be produced by various methods. It is, however, quite difficult to produce polycarbonate having an acetone soluble content of not more than 3.5% by weight by the conventional methods. In accordance with the process of the second invention, the polycarbonate can be produced with high efficiency and high quality. Thus the process of the second invention is preferably employed to produce the polycarbonate of the first invention.

In accordance with the process of the second invention, a polycarbonate oligomer previously derived from bisphenol A and phosgene, and bisphenol A are used as polymerization starting materials, and as a terminator, cumylphenol is added to the reaction system. In addition, if necessary, an organic solvent such as methylene chloride, chloroform, chlorobenzene, carbon tetrachloride and the like, and a catalyst such as tertiary amines (e.g., triethylamine) are added to prepare a reaction mixture. In this case, bisphenol A is preferably added after dissolving in an aqueous solution of alkali hydroxide such as sodium hydroxide and potassium hydroxide.

In the process of the second invention, the above components are first reacted with each other while stirring so that the reaction mixture is in a turbulent flow condition. In connection with this stirring, there are no special limitations to stirring speed and so forth, as long as the reaction is allowed to proceed in the state that the reaction mixture is in a turbulent flow condition. Usually it suffices that stirring is carried out at 400 rpm or more. In connection with the reaction time, it varies with various conditions and cannot be determined unconditionally. In general, it suffices that at a stirring speed of 400 rpm or more, the reaction is carried out for at least one minute.

The above reaction in a turbulent flow condition is continued until the viscosity of the reaction mixture increases. At this point of time that the viscosity of the reaction mixture increases, an aqueous alkali hydroxide (e.g., sodium hydroxide, potassium hydroxide and the like) solution is added and at the same time, stirring conditions are changed so that the flow of the reaction mixture is converted from a turbulent flow to a laminar flow. In this state, the reaction is continued. Stirring conditions under which the reaction mixture is in a laminar flow condition are influenced by the viscosity of the reaction mixture and so forth and cannot be determined unconditionally. In general, it suffices that stirring is carried out at a speed of not more than 300 rpm. In connection with the reaction time, it varied with various conditions and cannot be determined unconditionally. In general, it suffices that at a stirring speed of not more than 300 rpm, the reaction is carried out for 0.5 to 2 hours.

In the process of the second invention, the flow of the reaction mixture is changed from a turbulent flow to a laminar flow at the point of time that the viscosity of the reaction mixture increases. This increase in viscosity, however, cannot be specified numerically. Thus it suffices that the point of time that the flow of the reaction mixture is changed is determined by observing with the eye a change in viscosity of the reaction mixture. This determination can be made relatively easily in practice.

In the process of the second invention, the polymerization reaction is carried out according to the steps as described above. It is preferred that the proportion of each component at each reaction step be chosen within the range as described below.

$$0.04 < b/a < 0.17$$

$$0.40 < c/a < 0.55$$

$$2.02 < d/c < 2.50$$

$$1.40 < (d+e)/a < 1.60$$

$$1.0 \times 10^{-3} < f/a < 5.0 \times 10$$

wherein
a: mole number of the chloroformate group of the polycarbonate oligomer;
b: mole number of cumylphenol;
c: mole number of bisphenol A;

d: mole number of alkali hydroxide contained in an aqueous alkali hydroxide solution in which bisphenol A is dissolved;

e: mole number of alkali hydroxide contained in an aqueous alkali hydroxide solution to be added at the point of time that the flow of the reaction mixture is changed from a turbulent flow to a laminar flow; and f: mole number of a tertiary amine catalyst.

If b/a is 0.04 or less, the viscosity undesirably increases. On the other hand, if it is 0.17 or more, the strength of the resulting polycarbonate is low.

If c/a is 0.40 or less, the molecular weight is not sufficiently high. On the other hand, if it is 0.55 or more, unreacted bisphenol A remains excessively.

If d/c is 2.02 or less, bisphenol A is not dissolved. On the other hand, if it is 2.50 or more, the chloroformate group is decomposed.

If (d+e)/a is 1.40 or less, the molecular weight is not sufficiently high. On the other hand, if it is 1.60 or more, the decomposition of the chloroformate group vigorously occurs.

If f/a is $1.0 \times 10^{-3}$ or less, the rate of reaction is low. On the other hand, if it is $5.0 \times 10^{-3}$ or more, the decomposition of the chloroformate group vigorously occurs.

The polycarbonate resin composition of the third invention comprises, as described above, a polycarbonate resin produced using cumylphenol as a polymerization modifier and 0.01 to 0.13 part by weight per 100 parts by weight of the polycarbonate resin of a phosphorus-based antioxidant.

The polycarbonate resin to be used in the composition of the third invention is a polymer having the same structure as the polycarbonate of the first invention; that is, it comprises a main chain comprising a repeating unit represented by the formula (I) and a cumylphenoxy group or cumylphenoxy groups bonded thereto as a terminal group or terminal groups, as represented by the formula (II).

The polycarbonate resin to be used in the composition of the third invention can be easily produced, for example, by the phosgene method in which a divalent phenol containing cumylphenol as a polymerization modifier and phosgene are reacted.

In this phosgene method, when the divalent phenol dissolved in an aqueous alkali solution and phosgene are reacted in the presence of an inert organic solvent, the above cumylphenol is added before the reaction or during the reaction and the interfacial polycondensation reaction is carried out, whereupon the desired polycarbonate is obtained. In addition, the desired polycarbonate can be obtained by the pyridine method in which a divalent phenol and the polymerization modifier are dissolved in pyridine or a mixed solvent of pyridine and an inert solvent, and phosgene is blown into the resulting solution to react them.

Divalent phenols which can be used as the starting material include hydroquinone, 4,4'-dihydroxydiphenyl, bis(4-hydroxyphenyl)alkane (particularly bisphenol A: 2,2-bis(4'-hydroxyphenyl)propane), bis(4-hydroxyphenyl)cycloalkane, bis(4-hydroxyphenyl)oxide, bis(4-hydroxyphenyl)sulfide, bis(4-hydroxyphenyl)sulfone, bis(4-hydroxyphenyl)ketone, etc., and their halogen-substituted derivatives.

The viscosity average molecular weight of the polycarbonate resin to be used in the composition of the third invention is preferably 10,000 to 50,000.

The acetone soluble content of the polycarbonate resin to be used in the composition of the third invention is not critical, but it is preferably not more than 3.5% by weight.

The polycarbonate resin composition of the third invention is prepared by mixing the above polycarbonate resin and a phosphorus-based antioxidant with the convention method.

As the phosphorus-based antioxidant to be used in the composition of the third invention, as well as trinonyl phosphite and 2-ethylhexyldiphenyl phosphite, trialkyl phosphite such as trimethyl phosphite, triethyl phosphite, tributyl phosphite, trioctyl phosphite, tridecyl phosphite, trioctadecyl phosphite, distearylpentaerythrityl diphosphite, tris(2-chloroethyl) phosphite, tris(2,3-dichloropropyl) phosphite and the like; tricycloalkyl phosphite such as tricyclohexyl phosphite; triaryl phosphite such as triphenyl phosphite, tricresyl phosphite, tris(ethylphenyl) phosphite, tris(butylphenyl) phosphite, tris(nonylphenyl) phosphite, tris(hydroxyphenyl) phosphite and the like; trialkyl phosphate such as trimethyl phosphate, triethyl phosphate, tributyl phosphate, trioctyl phosphate, tridecyl phosphate, trioctadecyl phosphate, distearylpentaerythrityl diphosphate, tris(2-chloroethyl) phosphate, tris(2,3-dichloropropyl) phosphate and the like; tricycloalkyl phosphate such as tricyclohexyl phosphate; triaryl phosphate such as triphenyl phosphate, tricresyl phosphate, tris(nonylphenyl) phosphate, 2-ethylphenyldiphenyl phosphate and the like; and the like can be used. These compounds can be used alone or as mixtures comprising two or more thereof.

Of these compounds, trisnonyl phosphite and 2-ethylhexyldiphenyl phosphite are preferred.

The amount of the phosphorus-based antioxidant compounded is 0.01 to 0.13 part by weight, preferably 0.03 to 0.1 part by weight per 100 parts by weight of the polycarbonate resin. If the amount of the phosphorus-based antioxidant compounded is less than 0.01 part by weight, the resulting molding is colored. On the other hand, if it is more than 0.13 part by weight, the mechanical strength undesirably drops.

In the polycarbonate resin composition of the third invention, a lubricant can be added to the composition in order to improve its release properties from a mold at the time of molding. Lubricants which can be used include stearyl alcohol, stearic acid esters such as stearic acid monoglyceride and pentaerythritol stearate, beeswax, and the like. These compounds can be used alone or as mixtures comprising two or more thereof.

The amount of the lubricant compounded is 0.2 to 0.4 part by weight per 100 parts by weight of the polycarbonate resin. If the amount of the lubricant compounded is less than 0.2 part by weight, the addition of the lubricant is not effective. On the other hand, if it is more than 0.4 part by weight, the mechanical strength undesirably drops.

To the polycarbonate resin composition of the third invention, if necessary, other additives such as an inorganic filler, a flame retardant, a stabilizer, a colorant and the like can be added.

The polycarbonate resin composition of the third invention can be prepared by conventional techniques such as by the use of an extruder. The polycarbonate resin composition of the third invention can be molded by known techniques such as injection molding.

As described above, the polycarbonate of the first invention is excellent in impact resistance, particularly at low temperatures. The polycarbonate resin of the first invention can be efficiently produced by the process of the second invention.

The polycarbonate of the first invention can be used widely and effectively in production of various industrial materials such as home electric appliances, Office Automation devices, construction materials and the like.

The polycarbonate resin composition of the third invention is of high fluidity and is excellent in impact resistance, particularly in low temperature impact resistance. Thus the polycarbonate resin composition of the third invention can be molded into articles thin in wall and complicated in shape which have been difficult to produce using the conventional polycarbonate resin compositions. Furthermore, in the polycarbonate resin composition of the third invention, even if a lubricant is added, a reduction in molecular weight is not caused and the mechanical strength can be maintained.

The present invention is described in greater detail with reference to the following examples.

EXAMPLE 1

(1) Preparation of Polycarbonate Oligomer 60 kg of bisphenol A was dissolved in 400 liters of a 5% aqueous sodium hydroxide solution to prepare a bisphenol A solution.

Then the bisphenol A solution as prepared above and methylene chloride each maintained at room temperature were introduced into a tubular reactor (inner diameter: 10 mm; length: 10 m) through an orifice at flow rates of 138 liters/hr. and 69 liters/hr., respectively, and phosgene was blown into the reactor as a parallel flow at a flow rate of 10.7 kg/hr. and reacted continuously for 3 hours. The above tubular reactor was jacketed, and the discharge temperature of the reaction mixture was maintained at 25° C. by passing cooling water in the jacket portion. The pH of the reaction mixture discharged was maintained at 10-11.

The reaction mixture thus obtained was allowed to stand, and an aqueous layer was separated to obtain 220 liters of a methylene chloride layer. To this methylene chloride layer was added 170 liters of methylene chloride, and the resulting mixture was thoroughly stirred to obtain a polycarbonate oligomer (concentration: 314.7 g/liter; degree of polymerization: 3-4; chloroformate concentration: 0.74 N).

(2) Preparation of Polycarbonate

To 5.72 liters of the polycarbonate oligomer obtained in (1) above was added 3.28 liters of methylene chloride to prepare Solution (I) (concentration: 200 g/liter; chloroformate concentration: 0.47 N).

173.4 g of sodium hydroxide and 482.9 g of bisphenol A were dissolved in 2.9 liters of water to prepare Solution (II).

Solutions (I) and (II) were mixed, and 0.856 g of triethylamine as a catalyst and 72.3 g of cumylphenol as a terminator were added. The resulting mixture was stirred in a turbular flow condition for 10 minutes at 600 rpm.

Then, 167 milliliters of an aqueous solution of sodium hydroxide (concentration: 48% by weight) was added, and the resulting mixture was reacted in a laminar flow condition for 60 minutes by stirring at 200 rpm.

After the reaction was completed, 5 liters of water and 5 liters of methylene chloride were added, and the resulting mixture was separated into a methylene chloride layer and an aqueous layer. This methylene chloride layer was subjected to alkali washing using a 0.01 N aqueous sodium hydroxide solution and further to acid washing using 0.1 N hydrochloric acid. Then the layer was washed with water to remove the methylene chloride, and polycarbonate in a flake form was obtained. The viscosity average molecular weight (Mv) of the polymer thus obtained was 19,000. Furthermore the flake-shaped polycarbonate was subjected to Soxhlet extraction for 8 hours to determine the acetone soluble content.

The flake-shaped polymer was pelletized by the use of an extruder at a temperature of 220°-270° C. The pellets thus obtained were injection molded to produce a test piece. This test piece was used to measure Izod impact resistance.

The results are shown in Table 1.

EXAMPLE 2

The procedure of (2) of Example 1 was repeated with the exception that 67.2 g of cumylphenol was used in place of 72.3 g of cumylphenol.

The results are shown in Table 1.

EXAMPLE 3

The procedure of (2) of Example 1 was repeated with the exception that 176.0 g of sodium hydroxide was used in place of 173.4 g of sodium hydroxide.

The results are shown in Table 1.

EXAMPLE 4

The procedure of (2) of Example 1 was repeated with the exception that 178.5 g of sodium hydroxide was used in place of 173.4 g of sodium hydroxide.

The results are shown in Table 1.

COMPARATIVE EXAMPLE 1

The procedure of (2) of Example 1 was repeated with the exception that 51.2 g of p-tert-butylphenol was used in place of 72.3 g of cumylphenol.

The results are shown in Table 1.

COMPARATIVE EXAMPLE 2

The procedure of (2) of Example 1 was repeated with the exception that 47.5 g of p-tert-butylphenol was used in place of 72.3 g of cumylphenol.

The results are shown in Table 1.

COMPARATIVE EXAMPLE 3

253.8 g of sodium hydroxide and 482.9 g of bisphenol A were dissolved in 3.0 liters of water to prepare Solution (III).

Solution (I) prepared in Example 1 and Solution (III) as prepared above were mixed, and 0.856 g of triethylamine as a catalyst and 72.3 g of cumylphenol as a terminator were added. The resulting mixture was reacted for 1.5 hours while stirring at 500 rpm. After the reaction was completed, the reaction mixture was processed in the same manner as in Example 1.

The results are shown in Table 1.

COMPARATIVE EXAMPLE 4

432 g of sodium hydroxide was dissolved in 5.3 liters of water. In the resulting solution were dissolved 912 g of bisphenol A, 20 g of cumylphenol and 1.0 g of hydrosulfite while maintaining the temperature at 20° C., and 3,250 g of methylene chloride was added. Then, 436 g of phosgene was blown into the resulting mixture over 60 minutes while stirring. After the completion of introduction of phosgene, the reaction mixture was emulsified by vigorously stirring at 600 rpm. After emulsification, 1.0 g of triethylamine was added, and the resulting mixture was stirred for about one hour to achieve polymerization.

An aqueous layer and a methylene chloride layer were separated from the polymerization mixture, and the methylene chloride layer was neutralized with phosphoric acid. Washing with water was repeated until the washing water became neutral. Then, 4,000 g of isopropanol was added to precipitate a polymer. The precipitate was filtered off and dried in vacuum at 50° C. to obtain polycarbonate in a white powder form. Thereafter the polycarbonate was processed in the same manner as in Example 1.

The results are shown in Table 1.

TABLE 1

| Run No. | Acetone Soluble Content*1 (wt %) | Viscosity Average Molecular Weight*2 (Mv) | Mw/Mn*3 | d/c | b/a | Izod Impact Strength*4 0° C. | −5° C. | 10° C. |
|---|---|---|---|---|---|---|---|---|
| Example 1 | 1.8 | 1.9 × 10⁴ | 1.9 | 2.05 | 0.081 | 10 | 9 | 4 |
| Example 2 | 1.7 | 2.1 × 10⁴ | 1.8 | 2.05 | 0.075 | 10 | 10 | 5 |
| Example 3 | 2.3 | 1.9 × 10⁴ | 2.0 | 2.08 | 0.081 | 10 | 9 | 4 |
| Example 4 | 2.8 | 1.9 × 10⁴ | 2.1 | 2.10 | 0.081 | 10 | 8 | 3 |
| Comparative Example 1 | 1.9 | 1.9 × 10⁴ | 1.9 | 2.05 | 0.081 | 8 | 2 | 1 |
| Comparative Example 2 | 1.7 | 2.1 × 10⁴ | 1.8 | 2.05 | 0.075 | 9 | 3 | 1 |
| Comparative Example 3 | 3.7 | 1.9 × 10⁴ | 3.0 | — | 0.081 | 9 | 5 | 2 |
| Comparative Example 4 | 3.7 | 1.9 × 10⁴ | 3.0 | — | — | 8 | 4 | 1 |

EXAMPLES 5 TO 10, AND COMPARATIVE EXAMPLES 5 TO 13

(1) Preparation of Polycarbonate Oligomer

A polycarbonate oligomer was prepared in the same manner as in (1) of Example 1.

(2) Preparation of Polycarbonate (a) Polycarbonate A1

0.51 mol of cumylphenol as a polymerization modifier was dissolved in 9.0 liters of the polycarbonate oligomer as prepared in (1) above.

23.5 g (0.59 mol) of sodium hydroxide was dissolved in 600 milliliters of water, and 5.2 milliliters of triethylamine was added thereto. The resulting mixture was added to the above polycarbonate oligomer with the above polymerization modifier dissolved therein, and the resulting mixture was stirred at ordinary temperature for one hour at 500 rpm. Then, 9.6 liters of methylene chloride and a solution of bisphenol A in an aqueous sodium hydroxide solution (containing 611 g of bisphenol A and 357 g of NaOH) were added, and the resulting mixture was stirred at ordinary temperature for 2 hours at 500 rpm.

Thereafter, 5 liters of methylene chloride was added, and the resulting mixture was washed with 5 liters of water, 5 liters of a 0.01 N aqueous sodium hydroxide solution, 5 liters of 0.1 N hydrochloric acid and 5 liters of water in this order. Then the methylene chloride was removed to obtain polycarbonate in a chip form. The viscosity average molecular weight of the polycarbonate A1 thus obtained was $1.9 \times 10^4$.

(b) Polycarbonate A2

Polycarbonate A2 was prepared in the same manner as in the preparation of Polycarbonate A1 except that p-tert-butylphenol was used as a polymerization modifier. The viscosity average molecular weight of the polycarbonate A2 was $1.9 \times 10^4$.

(c) Polycarbonate A3

Polycarbonate A3 was prepared in the same manner as in the preparation of Polycarbonate A1 except that phenyl was used as a polymerization modifier. The viscosity average molecular weight of the polycarbonate A3 was $1.8 \times 10^4$.

To 100 parts by weight of each of the polycarbonates A1, A2 and A3 as prepared above were added an antioxidant and a lubricant in the amounts shown in Table 2. The resulting mixture was pelletized at 220°–270° C. by the use of an extruder. The pellets thus obtained were injection molded to obtain a test piece. This test piece was measured for Izod impact strength.

The results are shown in Table 2.

The flow values of the compositions were in the range of 10.0 to 11.0 ($\times 10^{-2}$ ml/sec). In Comparative Example 13, coloration occurred.

TABLE 2

| Run No. | Poly-carbonate | Antioxidant*2 Type | (parts by weight) Amount | Lubricant*3 Type | (parts by weight) Amount | Izod Impact Strength*4 5° C. | 0° C. | −5° C. | −10° C. |
|---|---|---|---|---|---|---|---|---|---|
| Example 5 | A1 | B1 | 0.02 | — | — | 10 | 10 | 9 | 4 |
| Example 6 | A1 | B1 | 0.05 | — | — | 10 | 10 | 10 | 6 |
| Example 7 | A1 | B1 | 0.08 | — | — | 10 | 10 | 10 | 6 |
| Example 8 | A1 | B2 | 0.02 | — | — | 10 | 10 | 9 | 4 |
| Example 9 | A1 | B1 | 0.02 | C1 / C2 | 0.21 / 0.09 | 10 | 10 | 8 | 4 |
| Example 10 | A1 | B1 | 0.02 | C3 | 0.30 | 10 | 10 | 8 | 3 |

TABLE 2-continued

| Run No. | Poly-carbonate | Antioxidant*2 Type | Antioxidant*2 Amount (parts by weight) | Lubricant*3 Type | Lubricant*3 Amount (parts by weight) | Izod Impact Strength*4 5° C. | 0° C. | −5° C. | −10° C. |
|---|---|---|---|---|---|---|---|---|---|
| Comparative Example 5 | A1 | — | — | — | — | 10 | 8 | 4 | 0 |
| Comparative Example 6 | A1 | B1 | 0.05 | — | — | 10 | 8 | 5 | 0 |
| Comparative Example 7 | A1 | B1 | 0.15 | — | — | 10 | 10 | 6 | 2 |
| Comparative Example 8 | A2 | — | — | — | — | 10 | 8 | 3 | 0 |
| Comparative Example 9 | A2 | B1 | 0.05 | — | — | 10 | 9 | 4 | 2 |
| Comparative Example 10 | A3 | B1 | 0.05 | — | — | 10 | 9 | 4 | 1 |
| Comparative Example 11 | A2 | B1 | 0.02 | C1 / C2 | 0.21 / 0.09 | 8 | 4 | 0 | 0 |
| Comparative Example 12 | A2 | B1 | 0.02 | C3 | 0.30 | 8 | 3 | 0 | 0 |
| Comparative Example 13 | A1 | B3 | 0.02 | — | — | 10 | 8 | 5 | 0 |

EXAMPLES 11 TO 17

To 100 parts by weight of polycarbonate having an acetone soluble content of 1.8% by weight and a viscosity average molecular weight of $1.9 \times 10^4$ as prepared in Example 1 were added a phosphorus-based antioxidant and a lubricant in the amounts shown in Table 3. The resulting mixture was pelletized at 220°–270° C. by the use of an extruder. The pellets thus obtained were injection molded to obtain a test piece. This test piece was measured for Izod impact strength.

The results are shown in Table 3.

TABLE 3

| Run No. | Phosphorus-Based Antioxidant Type | Amount (parts by weight) | Lubricant Type | Amount (parts by weight) | Izod Impact Strength 0° C. | −5° C. | −10° C. |
|---|---|---|---|---|---|---|---|
| Example 11 | B1 | 0.02 | — | — | 10 | 10 | 8 |
| Example 12 | B1 | 0.05 | — | — | 10 | 10 | 9 |
| Example 13 | B1 | 0.08 | — | — | 10 | 10 | 9 |
| Example 14 | B1 | 0.02 | C1 / C2 | 0.21 / 0.09 | 10 | 10 | 6 |
| Example 15 | B2 | 0.02 | — | — | 10 | 10 | 8 |
| Example 16 | B1 | 0.005 | — | — | 10 | 9 | 4 |
| Example 17 | B1 | 0.15 | — | — | 10 | 8 | 3 |

B1 = Trisnonyl phosphite, B2 = 2-ethylhexyldiphenyl phosphite.
C1 = Stearyl alcohol, C2 = Stearic Acid Monoglyceride

What is claimed is:

1. High impact resistant polycarbonate: consisting of a main chain and terminal groups bonded thereto, said main chain comprising a repeating unit represented by the formula (I):

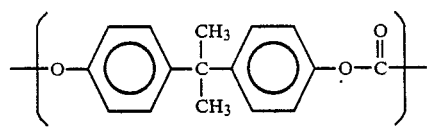
(I)

and at least one of the terminal groups being a cumylphenoxy group represented by the formula (II):

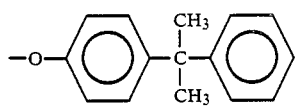
(II)

and having a viscosity average molecular weight of at least 10,000 and an acetone soluble content of not more than 3.5% by weight.

2. The polycarbonate as claimed in claim 1 wherein both the terminal groups are cumylphenoxy groups.

3. The polycarbonate as claimed in claim 2 wherein the main chain further contains a small amount of a repeating unit other than the repeating unit of the formula (I).

4. The polycarbonate as claimed in claim 2 wherein the viscosity average molecular weight is 10,000 to 50,000.

5. A process for producing high impact resistant polycarbonate consisting of a main chain and terminal groups bonded thereto, said main chain comprising a repeating unit represented by the formula (I):

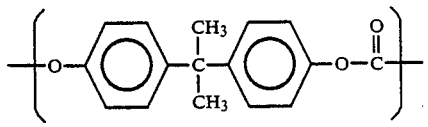

and at least one of said terminal groups being a cumylphenoxy group represented by the formula (II):

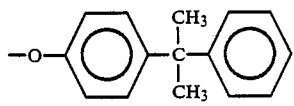

and having a viscosity average molecular weight of at least 10,000 and an acetone soluble content of not more than 3.5% by weight, which process comprises:

reacting a polycarbonate oligomer derived from bisphenol A, bisphenol A and cumylphenol in the presence of a tertiary amine catalyst while stirring so that the reaction mixture is in a turbulent flow condition;

adding an aqueous solution of alkali hydroxide at the point of time that the viscosity of the reaction mixture increases; and subsequently continuing the reaction in a laminar flow condition; and wherein the proportion of each component is chosen within the following ranges:

$0.04/1 < b/a < 0.17/1$, $0.40/1 < c/a < 0.55/1$, $2.01/1 < d/c < 2.50/1$, $1.40/1 < (d+e)/a < 1.60/1$, $1.0 \times 10^{-3} < f/a < 5.0 \times 10^{-3}$ wherein
a=mole number of the chloroformate group of the polycarbonate oligomer,
b=mole number of cumylphenol,
c=mole number of bisphenol A,
d=mole number of alkali hydroxide contained in an aqueous alkali hydroxide solution in which bisphenol A is dissolved,
e=mole number of alkali hydroxide contained in an aqueous alkali hydroxide solution to be added at the point of time that the flow of the reaction mixture is changed from a turbulent flow to a laminar flow, and
f=mole number of the tertiary amine.

6. The process as claimed in claim 5 wherein the polycarbonate oligomer is derived from bisphenol A and phosgene.

7. The process as claimed in claim 5 wherein the turbulent flow condition is produced by stirring the reaction mixture at at least 400 rpm.

8. The process as claimed in claim 7 wherein the laminar flow condition is produced by stirring the reaction mixture at not more than 300 rpm.

9. A polycarbonate resin composition comprising a polycarbonate resin and 0.01 to 0.13 part by weight per 100 parts by weight of the polycarbonate resin of a phosphorus-based antioxidant, wherein the polycarbonate resin consists of a main chain and terminal groups bonded thereto, said main chain comprising a repeating unit represented by the formula (I):

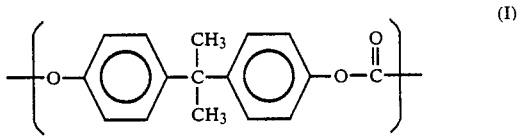

and at least one of the terminal groups being a cumylphenoxy group represented by the formula (II):

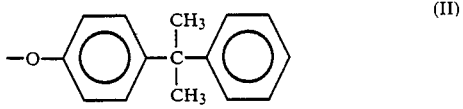

and has a viscosity average molecular weight of at least 10,000 and
wherein the polycarbonate resin has an acetone soluble content of not more than 3.5% by weight.

10. The composition as claimed in claim 9 wherein the phosphorus-based antioxidant is at least one compound selected from trialkyl phosphites, triaryl phosphites, trialkyl phosphates, triaryl phosphates, and 2-ethylhexyldiphenyl phosphite.

11. The composition as claimed in claim 9 wherein the phosphorus-based antioxidant is tris(nonylphenyl) phosphite, 2-ethylhexyldiphenyl phosphite, or mixture thereof.

* * * * *